(No Model.) 6 Sheets—Sheet 1.

G. ACKERMANN.
CAN SOLDERING MACHINE.

No. 315,877. Patented Apr. 14, 1885.

Fig. 1.

Attest:
L. J. Fisher
Jno. W. Strebli

Inventor:
George Ackermann
per Wm. Hubbell Fisher,
Atty.

(No Model.)  6 Sheets—Sheet 4.

G. ACKERMANN.
CAN SOLDERING MACHINE.

No. 315,877.   Patented Apr. 14, 1885.

Attest:
L. J. Fisher
Jno. W. Strehli

Inventor:
George Ackermann
per Wm. Hubbell Fisher,
Atty.

N. PETERS, Photo-Lithographer, Washington, D. C.

(No Model.) 6 Sheets—Sheet 5.

G. ACKERMANN.
CAN SOLDERING MACHINE.

No. 315,877. Patented Apr. 14, 1885.

(No Model.) 6 Sheets—Sheet 6.

G. ACKERMANN.
CAN SOLDERING MACHINE.

No. 315,877. Patented Apr. 14, 1885.

ATTEST,
Jno. W. Strehli,
O. M. Hill

INVENTOR,
George Ackerman
per Wm. Hubbell Fisher
Atty

N. PETERS. Photo-Lithographer, Washington, D. C.

UNITED STATES PATENT OFFICE.

GEORGE ACKERMANN, OF CINCINNATI, OHIO, ASSIGNOR OF FIVE-SIXTHS TO ALBERT FISCHER, AUGUST BAUM, GEORGE BALZ, AND CHAS. F. LOUDON, ALL OF SAME PLACE, AND JOHN WAGNER, OF DAYTON, KENTUCKY.

CAN-SOLDERING MACHINE.

SPECIFICATION forming part of Letters Patent No. 315,877, dated April 14, 1885.

Application filed July 14, 1884. (No model.)

*To all whom it may concern:*

Be it known that I, GEORGE ACKERMANN, a resident of Cincinnati, in the county of Hamilton and State of Ohio, have invented certain new and useful Improvements in Can-Soldering Machines, of which the following is a specification.

In the manufacture of cans to contain fruits, preserves, meats, &c., it is essential that the work should be well done. If the soldering be imperfect, the contents of the filled cans will spoil. As a matter of general economy it is also necessary to do the work on a large scale.

My invention provides a machine by which the ends of the can are well soldered to the body of the can in an expeditious and economical manner. It will be seen that the principal features of my machine are, first, a device wherein a series of cans can be quickly placed to be soldered, and whereby said series of cans are held in position for soldering, and are successively presented to be soldered, and, finally, from which the cans when the ends have been soldered to the body may be readily withdrawn; secondly, a device for applying the solder thoroughly and evenly over the joints.

In the accompanying drawings.

A frame, A, supports the machine. It consists of two lateral pieces, A', similar in conformation, which are provided with legs $a$, or equivalent supports, and are suitably connected with each other—as, for example, by cross-pieces or tables $a'$ $a^2$, and also by the lower rods, $a^3$. From the tops of the table $a^2$ the standards B rise. The standards B are provided with arms $b$ $b'$, the one, $b$, projecting forwardly over the machine, and the other, $b'$, directly upward. Such is the preferred construction of the frame-work in which the working parts of the machine are placed.

A shaft, C, is journaled in bearings $a^4$ in the lateral supporting-pieces A', one of such bearings $a^4$ being in each piece A'. Keyed to or otherwise fixedly attached to the shaft C are two sets of wheels, rotatable frames or spiders, D, and a wheel, E, for regulating and controlling the travel of the can-holders. There are also centered and working on shaft C a cone-pulley, consisting of the pulleys F and F', fixedly connected together and to a large gear-wheel, G. (See Fig. 3.) This cone-pulley and wheel G turn loosely on shaft C.

Figure 2:
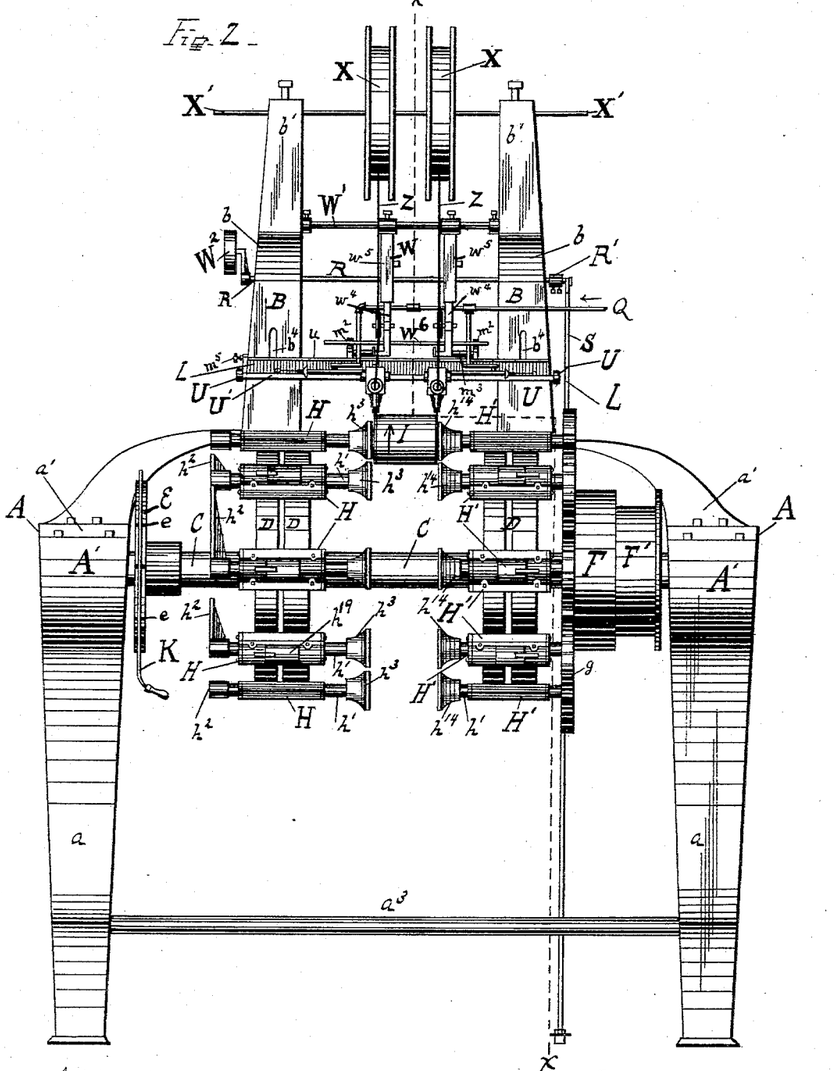
Fig. 2 represents a front elevation of the machine.

The general device here is the placing of a series of can holders or clamps about the shaft C, the rotation of which shaft brings one can after another under the soldering-irons. The particular preferred means which I employ to secure this end are as follows: A number of can-holders, H H', are attached to the rotatable frames D D' at points equally distant from each other. Two holders, H and H', are placed horizontally opposite each other, so that they may grasp the can, as shown in Fig. 2.

Figures 4, 5, 6, 7, 8:
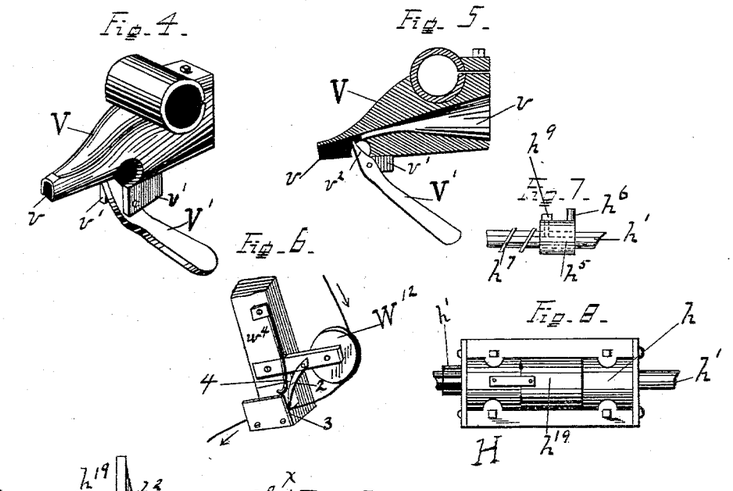
Fig. 4 shows in perspective the preferred construction of the nozzle of the solder-feeder.
Fig. 5 represents a vertical central longitudinal section of the nozzle of the solder-feeder.
Fig. 6 represents a portion of the solder-feeder.
Figs. 7, 8, and 9 illustrate certain details of the can-holder.
Figures 9, 10, 11, 13:
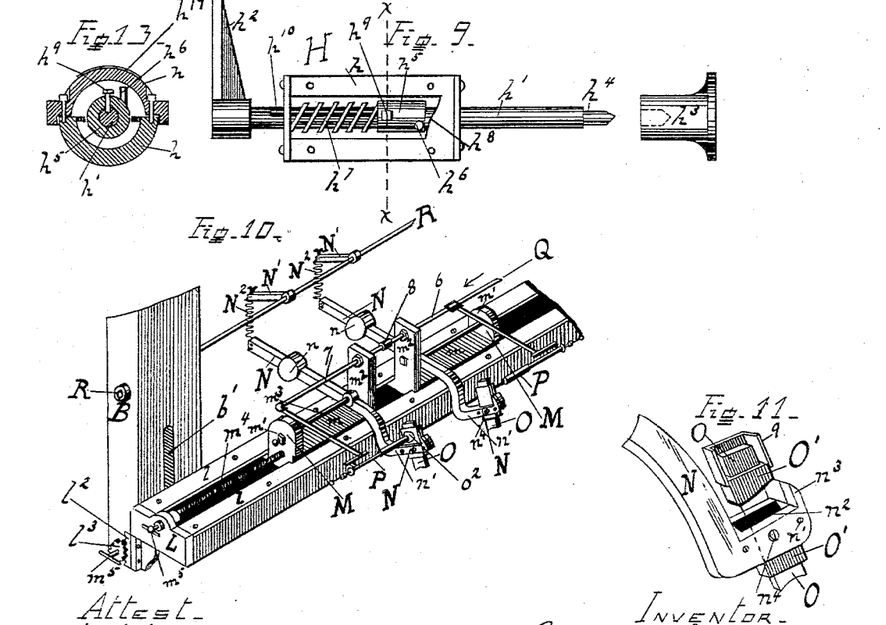
Fig. 10 represents in perspective a view of the soldering-irons and of the preferred means for rendering them adjustable and for heating said irons.
Fig. 11 gives a detailed view of one of the soldering-irons and its casing and holder, the central portion of the iron and its casing being broken away to show the opening in the holder which receives said casing and iron.
Fig. 13, Sheet 4, represents a vertical transverse section through the box $h$, taken at the dotted line $x$ $x$ of Fig. 9, that end of the section being shown which would appear in looking from left to right in Fig. 9.
Figure 12:
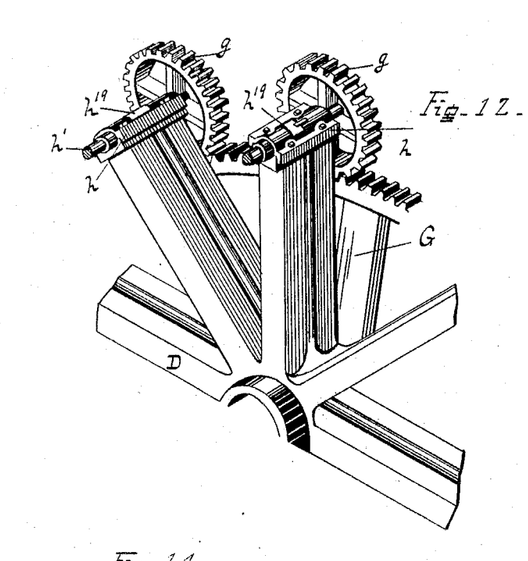
Fig. 12, Sheet 5, represents in perspective a portion of one of the rotatable frames or spiders which support and carry a series of can-holders, the can-holders being shown attached thereto, and showing the pinions for respectively operating the can-holders and a part of the central gear for operating the pinions, the discal blocks $h^3$ being removed in order to better show the connection between the can-holder box and the rotatable frame.

The can-holders H are preferably made as follows: A case or box, $h$, incloses a rod, $h'$. (See Figs. 8 and 9.) The outer end of the rod $h'$ is provided with the handle $h^2$, and the inner end with the discal block or plate $h^3$, (see Figs. 9 and 2,) this discal block $h^3$ fitting over the stem $h^4$ of rod $h'$ in such a manner as to loosely turn upon the said stem. This stem $h^4$ is preferably pointed, and the inner end of the recess in block $h^3$, which receives the stem, is then concaved to fit the pointed end of said stem, thus compelling the block to be correctly centered on the stem $h^4$. In Fig. 9 the block $h^3$ is shown detached from the stem $h^4$. A collar, $h^5$, is connected to that portion of the rod $h'$, which is within the box $h$, (see Figs. 7 and 9,) and this collar is provided with a pin, $h^6$, which bears against the cam-surface $h^8$. (See Figs. 9 and 13.) In Fig. 8 the outer or front side of the box $h$ is shown, and in Fig. 9 a portion of the front side of the box is broken away to show the interior thereof and the parts it contains.

The collar $h^5$ is compelled to turn with the rod $h'$ by means which at the same time allows the rod $h'$ to be longitudinally slid through collar $h^5$, and the collar then set at any desired point on the rod $h'$. The preferred means for accomplishing these functions is, a longitudinal slot or channel is present in rod $h'$, and a set-screw, $h^9$, is present in the collar $h^5$, and the inner end of the set-screw enters the slot $h^{10}$ of the rod $h'$, and can at will be made to impinge against the slot $h^{10}$, thus setting the collar at the desired point along the rod $h'$. Thus by the presence of the set-screw in the slot, the collar is compelled to rotate with the rod $h'$, and yet by loosening the set-screw so that it shall not impinge on the bottom of the slot the rod $h'$ can be slid through the collar, and then by screwing down the set-screw against the bottom of the slot the collar $h^5$ is firmly secured to the rod $h'$ at the desired point along the length of the latter. The slot serves to keep the pin $h^6$ of the collar and the handle $h^2$ of the rod always in the same relative position, and also facilitates the adjusting of the rod $h'$ to the different lengths of cans to be soldered.

Between the end of the box $h$ and the collar $h^5$ a spring, $h^7$, is compressed. This spring, when a can is between a holder, H, and holder H', serves to clamp the can between said holders. When the can is not between said holders, the spring, by bearing against the collar $h^5$, serves to press the pin $h^6$ against the cam-surface $h^8$. When desired, the pin $h^6$ can move in a cam or inclined groove, and the spring be placed so as to simply act in compressing or clamping the can between the holders; but I prefer the first mode of arranging the spring, as shown in the drawings. In the box $h$ an opening over the cam is closed by a door, $h^{19}$. (See Fig. 8.) From this arrangement it is seen that a forward movement of the handle $h^2$, as shown in Fig. 9, will retract the rod $h'$, and increase the distance between the blocks $h^3$ by an amount equal to the throw of the cam $h^8$, thus permitting the can which has been soldered to be removed and a new can put in its place.

Figure 14:
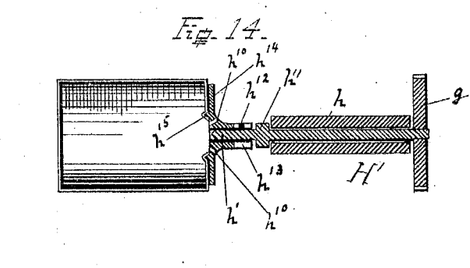
Fig. 14, Sheet 5, represents a vertical longitudinal central section of the box $h$ forming a part of can-holders H', and showing the pinion in elevation.

In the holders H' the rod $h'$ passes straight through the box $h$ and has a collar, $h^{11}$, fixed thereon to prevent the pinion sliding back through the box $h$. Within the box the rod $h'$ has no collar, or pin, or set-screw, and the box has no cam-surface. The door $h^{19}$ is also preferably omitted from the box of said holder H'. The block $h^{14}$ of holder H' is firmly cast with or secured to the rod $h'$, so as to turn with it, the preferable means being a pin or set-screw, $h^{12}$, (see Fig. 14,) passed through a hole or opening, $h^{13}$, in the block $h^{14}$, and entering a hole in the rod $h'$. If the rear end of opening $h^{13}$ is open, as shown, the block $h^{14}$ can be drawn off of rod $h'$ and replaced thereon or another block substituted therefor without disturbing the pin in rod $h'$.

Figure 15:
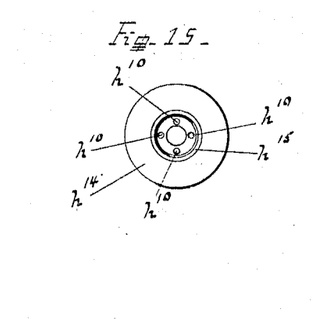
Fig. 15, Sheet 5, represents an end elevation of the front of the blocks of the series of can-holders on the right-hand side of the machine—that is to say, that side of the machine which is at the right hand of the operator while facing the machine and operating said machine.
Figure 16:
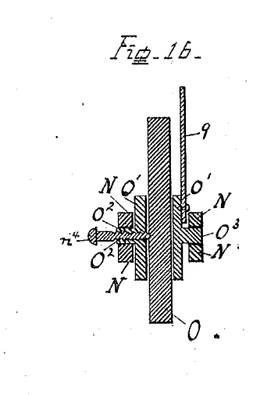
Fig. 16, Sheet 5, represents a transverse vertical section of one of the soldering-irons, its casing, and holder, taken through the fulcrum points of said casing and iron.
Figure 17:
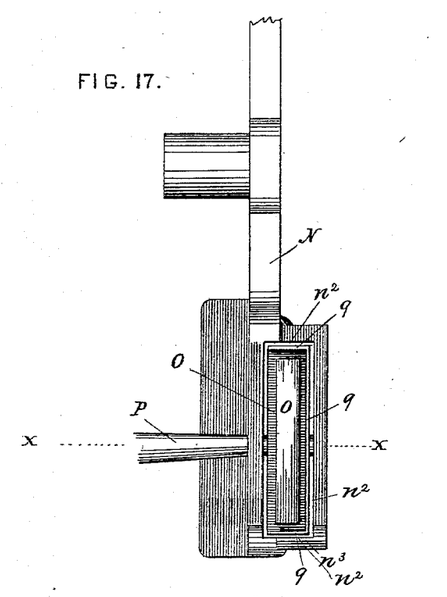
Fig. 17, Sheet 6, is a top view of one of the soldering-irons, its casing, holder, and the burner.
Figure 18:
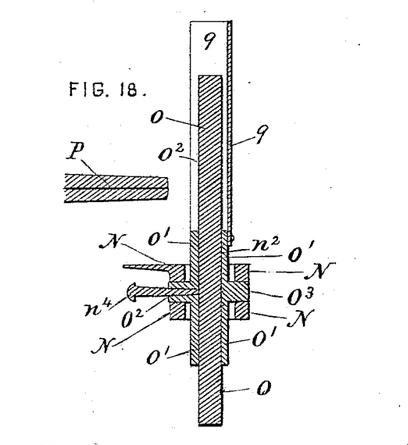
Fig. 18, Sheet 6, is a vertical central transverse section of the device shown in Fig. 17.

The blocks $h^3$ of holders H or of holders H', whichever set of blocks is intended to have the heads of the cans respectively rest against them, (in the present instance blocks $h^{14}$ receive said heads,) are each provided with small openings $h^{10}$. (See Figs. 14 and 15.) These openings $h^{10}$ pass entirely through the plate of the block at points in its diameter outside of where the rod $h$ is, and permit a free communication between the inside of the can and the open air. The face of the block $h^{14}$ is provided with an annular bead, $h^{15}$, which, when a can is applied thereto, enters the annular sealing-groove present around the mouth of the can, so as to more readily and accurately center the can in the can-holding device.

While soldering the ends of cans to the cylinder the air in the cans becomes so heated by the soldering process that unless it find vent it will by its expansion ruin many cans by bursting through the fresh solder. By a provision such as the holes just named the expanding air in the can passes through the hole in that end which is subsequently to receive the cover and escapes through the holes $h^{10}$. The cans are thus in no way damaged by the escaping air.

On the rear end of the rod $h'$ the pinion $g$ is rigidly fixed with the rod $h'$, which meshes with the gear G. The driving-pulley F (see Fig. 2) being firmly united to the gear G, motion imparted to it is transmitted through the gear G to the pinions $g$, (see Figs. 2 and 3,) and in this way the cans are made to rotate on their own axes toward and under the soldering-irons and while in the process of cooling the solder and can, in order to keep the solder uniformly spread over and distributed along the newly-soldered seam.

The stem $h^4$, fitting somewhat loosely into the block $h^3$, (see Fig. 9,) enables the latter to turn without turning the rod $h'$ of the holder H.

The setting-wheel E (see Figs. 1 and 2) is conveniently placed to the left-hand end of the shaft C. It has on its peripheral surface a number of notches, $e$, which correspond in number to the number of can-holders employed.

A bent lever, K, is fulcrumed at some convenient point on the inside of the frame A, and encircles part of the circumference of the setting-wheel E. On its under surface a tooth, $k$, is placed, which fits into the notches $e$, and when in a notch $e$ holds the wheel K steadily in position. It is now necessary to provide a soldering iron or irons, and as it is desirable to simultaneously solder the ends of the cans to their respective adjacent ends of can body or cylinder a pair of these soldering-irons should be employed. A preferred mode of supporting and constructing these irons is by the following means, viz: A bed, L, is bolted to the standards B by bolts $b^3$, (see Fig. 3,) which bolts pass through slots $b^4$, (see Fig. 2,) the slots $b^4$ allowing the bed to be raised or lowered, as may be necessary, the raising or lowering being done by the rack $l^2$ or pinion $l^3$, or equivalent mechanism. (See Fig. 1.) As shown in Fig. 10 and in cross-section in Fig. 3, the bed L is made with a bottom and sides, and to the top of the sides plates $l$ are secured. The plates $l$ fit into grooves in the sides of the slides M and hold them in place. (See more particularly Fig. 10.) Each slide M consists of a bottom, $m$, and two ends, $m'$ and $m^2$. Between the ends $m'$ and $m^2$ a rod, $m^3$, passes and forms the fulcrum for the soldering-iron carriers N. Into one of the slides M a rod, $m^4$, screws, being operated by a handle, $m^5$. The object of this arrangement is to regulate the distance between the soldering-irons, so that the latter can be adjusted to properly bear upon the seams of cans of different lengths.

When the can-holders on the right-hand side of the machine are stationary, and when all adjustment for the change in the lengths of the cans is made in the can-holders on the left-hand side of the machine, then but one screw $m^4$ is usually employed, as shown; but, when desired, another screw, the duplicate of $m^4$, may be also employed to move the right-hand slide M, and where the side surfaces of the copper piece of the soldering-iron are uneven the presence of two such screws—one for each slide M—is desirable, to better adjust the copper to the screw upon which it (the copper) bears.

The soldering-iron holders N are bent levers (see Figs. 1, 3, 10, and 11) fulcrumed on the rods $m^3$, and carrying in their free extremities the soldering-irons O, (which latter will be more fully described hereinafter,) and being connected at their other ends with a series of levers, bringing them under the control of the operator. When necessary, a counter-balance, $n$, is secured to the proper point on the lever N.

The rod R passes from one standard B to the other, and is fulcrumed in them. The two short levers or arms N' are firmly attached to the rod R, and the springs $N^2$ unite the arms N' with soldering-iron holders N by a flexible elastic connection. This flexible elastic connection serves to keep the soldering-iron at all times (when the can is to be soldered) upon the seam of the can, and at the same time allow the iron to rise and fall as it meets with irregularities in the surface of the can at and in the vicinity of the seam, and also to allow the iron to move up and down when the can is somewhat out of center, and when the can then acts eccentrically upon the soldering-iron.

To one end of the rod R, preferably the right-hand end, an arm or lever, R', is secured, (see Figs. 1 and 2,) and is fulcrumed at its outer end to the connecting-rod S, which forms the connection between it and the foot-lever T, the latter being suitably fulcrumed, as at $t$, and having treadle $t'$.

Any suitable mode of counterbalancing the weight of the rear end of the treadle and of rod S, lever R', may be employed. A desirable means for this purpose consists of lever $W^2$, one end of which is rigidly fixed to shaft or rod R, and at or near its free end with counterbalance-weight $W^3$. Numerous small holes, $s'$, allow of an adjustment of the relations between rod S and arm R' by means of a movable pin-connection between said rod and arm, so that the soldering-iron may be depressed more or less, as may be required.

In Figs. 10 and 11 the details of the soldering-iron are shown. The holder N terminates in a foot, $n'$, which has the opening $n^2$ passing through it. A tooth or flange, $n^3$, projects upwardly from the end of the foot $n'$. The soldering-iron O is inclosed in a casing, O'. (See Figs. 11, 16, 17, and 18.) This fits quite loosely in the opening $n^2$, and is pivotally supported on each side by a pivot, $O^3$. Each pivot enters and is journaled in its adjacent side of the holder N. Through one of these pivots $O^3$ passes a set-screw, $n^4$, whose thread engages a female thread in the pivot $O^3$, and whose inner pointed end impinges against the copper piece O. By advancing this set-screw it enters the copper piece a short distance and holds the copper piece rigidly in and to the casing O'. These pivots $O^3$ allow the casing O' and its copper to have a vibratory motion within the holder N. The extent of this motion is limited on the one hand by the rear lower edge of the opening $n^2$, and on the other hand by the tooth $n^3$. An opening, $o^2$, (see Fig. 10,) is made in the side of the casing O', through which the gas-jet from the heater P reaches the soldering-iron O. The iron itself is preferably made of copper, and is usually slightly concave on the bottom, the better to adapt it to the shape of the cans. This capability of the soldering-iron to oscillate forward and backward enables it to accommodate itself to the irregularities of the surface of the can at or near the seam, and also to the irregular movement of the can when the latter is not accurately centered in the holding device, and at the same time the whole under surface of the soldering-iron will be kept in contact with the seam of the can.

The screw $n^4$ may be located elsewhere in the case O' than in the pivot $O^3$.

For applying the heat of the flame of the burner to both sides and edges of the soldering-iron, I employ a plate, 9, inclosing the soldering-iron on both edges and on that side which is opposite to where the flame of the burner impinges against the soldering-iron. This plate is not in contact with the soldering-iron, but at a short distance therefrom. The flame of the burner strikes against the side of the soldering-iron not covered by this plate, and then spreads toward the edges of the soldering-iron, and is there caught by the plate and passes around between the plate and the soldering-iron to the middle of the other side of said soldering-iron, and thus surrounds the latter and comes into contact with it on each of the four surfaces. The heat, after heating the soldering-iron, rises and passes off. This plate constitutes an extension of case O', and may be in one piece with case O', or in a separate piece suitably secured thereto.

The gas or gasoline pipe Q conducts gas to the burners P. Any burner may be used which will throw the flame forcibly against the irons.

From each end of the bed L an arm, U, projects, (see Figs. 1 and 3,) and uniting these two arms is a rod, U', on which the soldering shoes or points V swing. (See Figs. 1 and 3.) The shoe V has the opening $v$ (see Figs. 4 and 5) running through it. This opening $v$ is somewhat conical in shape, as seen in Fig. 5, and toward the point of the shoe extends through the bottom of the shoe. Two lugs, $v'$, project from the under surface of the shoe V, and have pivoted between them the pawl V', the weight of whose handle keeps the point $v^2$ up against the wire of solder, which lies in the opening $v$. The object of this pawl is to prevent the solder being retracted.

The shaft W' (see Fig. 2) extends between the two standards B, and carries the arms W, which swing with it. The arms W are preferably made in two sections, $w^5$ and $w^4$, so that the length of the arms W may be changed to suit circumstances.

On the extremity of the section $w^4$ a pulley-wheel, $W^{12}$, (see Figs. 1 and 3,) is placed, over which the solder wire or string runs. The arms W are connected by the rod $W^6$.

Two sheaves, X, (see Figs. 1, 2, and 3,) are placed on a shaft, X', which shaft rests in the arms $b'$. Each sheave carries a wire of solder.

Figure 1:
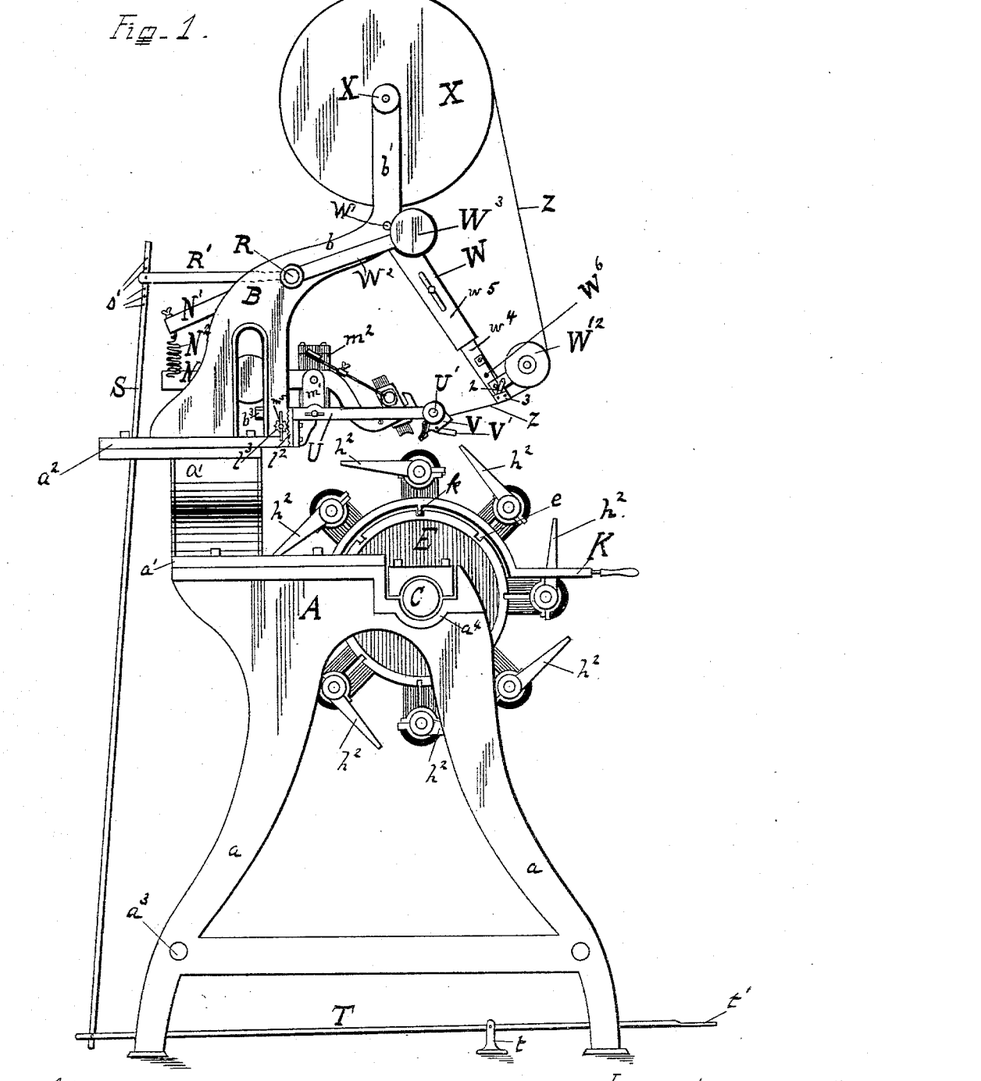
Figure 1 represents a side elevation of a machine illustrating my invention.
Figure 3:
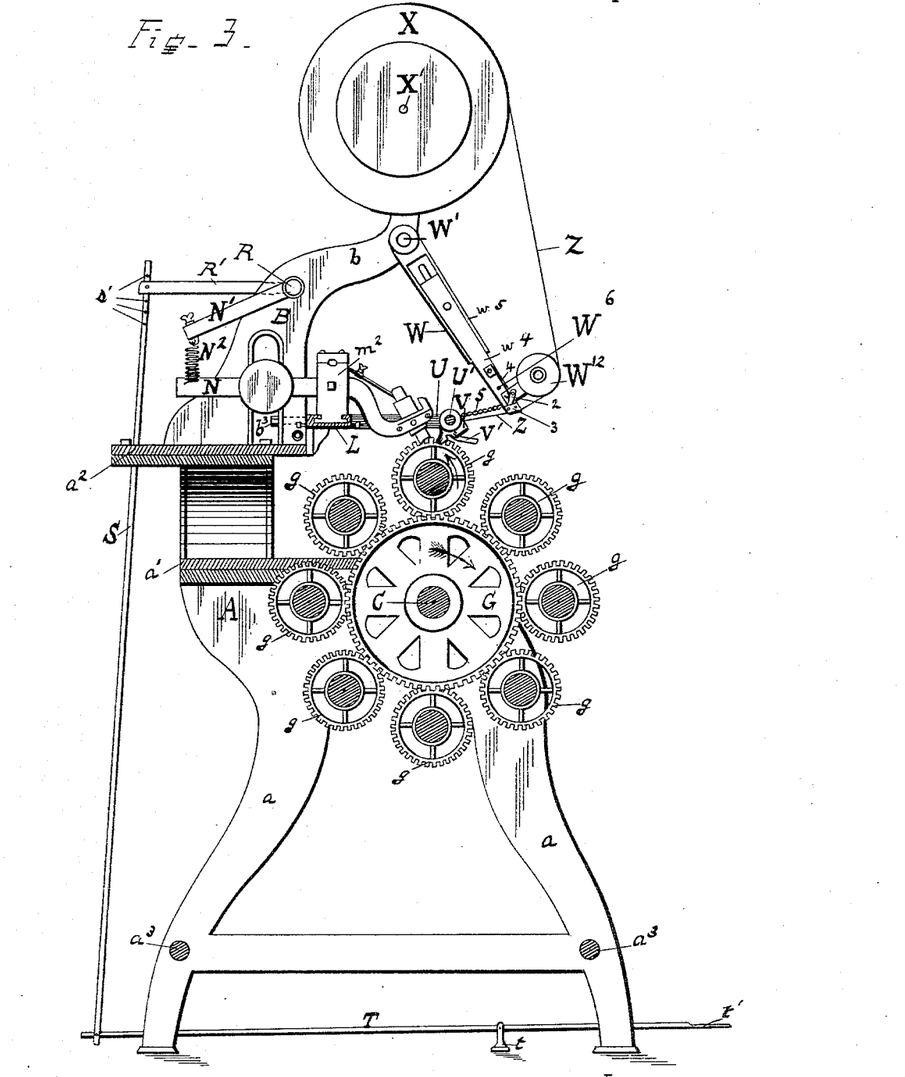
Fig. 3 represents a sectional elevation of the machine, and taken from front to rear at the broken line $x$ $x$ of Fig. 2.
Figure 19:
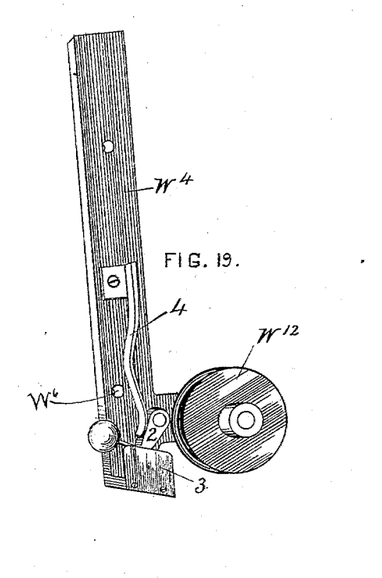
Fig. 19, Sheet 6, is an enlarged view in perspective of the device shown in Fig. 6.

When in operation, a quantity of string or wire solder is wrapped about the sheaves X, and the ends brought down, as shown in Figs. 1, 2, and 3, passed onto and around under the pulleys $W^{12}$, and between pawl 2 and the supporting-guide 3, this guide 3 being rigidly connected to the lower end of arm-section $w^4$. The free end of the pawl 2 is pressed down upon the solder-wire by means of a suitable spring, as 4, (see also Figs. 6 and 19,) and is for forcing the solder-wire forward in feeding the wire to the can. The wire then passes the opening $v$ in shoe V. The gas-blasts are then started, and the irons or copper O heated. The apparatus is then ready for operation. Two operators are required, one in front of the machine to watch the soldering, apply the solder, and to turn the can-carrier, the other at the rear to put the unsoldered cans on and remove them after they have been soldered. Before the cans are put into the machine they must be prepared by making the body and putting the two ends in position with resin rubbed on ready to receive the solder. The operator at the rear moves the handle $h^2$. Thus rod $h'$ is rotated, thereby rotating the pin $h^6$, which latter, moving on the cam-surface $h^8$, causes the rod $h'$, with its block $h^3$, to be moved away from the opposing holder H'. The can is then introduced between the holders, and its open or mouth end being fitted to the block $h^{14}$, as aforementioned, the handle $h^2$ is then moved in a reverse direction, thus taking the pressure of the spring off of the cam $h^8$ and the spring $h^7$, by means of the intervening-collar $h^5$ and rod $h'$, presses the block $h^3$ against the can and the can against block $h^{14}$, and thus the can is held firmly between the block $h^3$ of holder H and block $h^{14}$ of holder H'. The can is now in position to be brought under and into contact with the soldering-irons. The handle K is now raised by the operator in front of the machine. The tooth $k$ of said lever is thereby disengaged from the notch in large wheel E. This wheel E is rigidly fixed on shaft C, as are also the spiders or rotatable frames D D. The operator now grasps one of the frames D and turns the said frames, and along with them the wheel E and shaft C are rotated. The can-holders are thereby rotated with the shaft C, and the desired can-holder is brought under the soldering-iron. The operator having released his grasp of lever K, the tooth of the latter now engages with a notch in wheel E and holds the can-holder in position under the soldering-iron.

It will be remembered that the pulleys F F' and the gear-wheel G run loosely on the shaft C;

hence when they are in motion the shaft C, with its can-carriers, is not turned with them, but their motion is transmitted to the small pinions $g$, and through them to the can-holders, so that when in motion every can-holder and every can in the machine is turning on its own axis. This motion is adjusted so that the cans turn under the soldering-iron O from the front to the rear of the machine.

As shown in Fig. 1, the arm W has been drawn forward, from which position it, too, tends to fall slowly to a perpendicular one, forcing in its descent the string of solder through the opening in the shoe V onto the can. The shoe V guides the solder to the seams of the can directly in front of the hot irons O, which latter melt the solder and form the joint as the can rotates under said irons. As the action is carried on under both shoes, the top and bottom of the can are soldered at once thoroughly and well. The amount of solder to be delivered depends upon the distance to which the arms W are brought forward, and this distance is regulated by a chain, 5, (see Fig. 3,) or other appropriate stop to feed forward solder enough to solder the seams of the can. When one can is soldered, the operator raises the handle K, turns the can-holding device another notch, which brings another can directly under the soldering-iron. He now depresses the foot-rest or treadle $t$, which brings the soldering-irons down against the can, draws forward and upward the arms W by means of the rod $W^6$, and the soldering goes on, as before described. As the soldered cans come round to the rear of the machine, the operator takes them out and puts fresh cans in their places.

When the machine is adjusted for cans of a certain size, it is convenient to run cans of that size for several days; but the machine is adjustable and may be regulated to cans of any size. The distance between the can-holder carriers H and H' is increased or diminished preferably as follows: The set-screw $h^9$ of each carrier-holder (see Figs. 7, 9, and 13) is in turn loosened, and the rod $h'$ with block $h^3$ is moved through the collar $h^5$ toward or away from the respective opposing block $h^{14}$ of carrier H', according as the distance between the carriers H and H' is to be diminished or increased, and when the block $h^3$ is the proper distance from block $h^{14}$ the set-screw is again tightened and the collar rigidly connected to the rod $h'$. Thus the soldering-iron holders are capable of a lateral adjustment to suit the length of the cans.

To adjust the position of the soldering-irons to cans of different diameters, the rack and pinion at the end of the bed L are used to raise or lower the latter, as necessity may require. Before operating the pinion and rack the set-bolt $b^3$ is loosened, the pinion then turned, thereby raising or lowering the bed L to the desired elevation, and the bolt $b^3$ is then again tightened. To regulate the proper depression of the soldering-irons by the foot-lever T, the arm R is attached to connecting-rod S through the proper opening, $s'$. Thus the machine may be readily adjusted to suit any size of can.

For the purpose of enabling the burners P to move with their respective soldering-irons as the latter are moved together or apart, the sections 6 and 7 of the pipes of said burners are connected by a gas-tight coupling, 8, in which the adjacent ends of the said pipes 6 and 7 can be slid together or apart as the soldering-irons are moved together or apart. The section 6 is rigidly connected to the adjacent end or upright $m^2$, and section 7 is rigidly connected to its adjacent end or upright $m^2$. Thus as the slides M M, with their soldering-irons, are moved apart or together, their respective burners P move with them, and the position of each burner with respect to its adjacent soldering-iron remains always the same.

When desired, the case O' may be omitted and the solder-iron pivoted directly to the carrier end.

While the several features of my invention are preferably used together, one or more of them may be employed without the remainder; also, in so far as applicable, one or more of said features may be used in or in connection with soldering devices other than those specifically herein set forth.

What I claim as new and of my invention, and desire to secure by Letters Patent, is as follows:

1. Two series of opposing can-holders, H and H', each series arranged in an annular vertical row, each row rotating in a given vertical plane parallel to the plane of the opposing row, substantially as and for the purposes specified.

2. Two rows of opposing can-holders, each row having its can-holders disposed annularly equidistant from a common center and connected to said center and rotatable around the same, the holders in one row lying in a vertical plane at right angles to the axis of rotation, and the holders in the other row lying in a vertical plane at right angles to the axis of rotation, the planes in which the rows are being parallel to each other, the holders of one row being connected, respectively, to respective pinions $g$, arranged around and engaging with central operating-gear, G, substantially as and for the purposes specified.

3. Two series of opposing can-holders, H and H', each series arranged in an annular vertical row, each row rotating in a given vertical plane parallel to the plane of the opposing row, and devices for enabling the can-holders of one row to be adjusted nearer to or farther from the holders of the opposing row, substantially as and for the purposes specified.

4. The holder H, consisting of rod $h'$, provided at one end with block $h^3$, and at the other end with handle $h^2$ and with slot $h^{10}$, and collar $h^5$, having pin $h^6$ and set-screw $h^9$, the latter entering slot $h^{10}$, and spring $h^7$, compressed between the end of box $h$ and collar $h^5$, and fixed cam-surface $h^8$, against which pin $h^6$ impinges, substantially as and for the purposes specified.

5. The combination of the wheels or radial arms D, located on horizontal shaft C, and carrying at their periphery the can-holders for clamping the cans between the holders of one annular row and the holders of the opposing annular row so that the longitudinal axis of each can will be horizontal, substantially as and for the purposes specified.

6. The combination of the parallel vertical wheels or radial arms D, located on horizontal shaft C, and carrying at their periphery the can-holders for clamping the cans between the holders of one annular row and the holders of the opposing annular row so that the longitudinal axis of each can will be horizontal, substantially as and for the purposes specified.

7. In combination, the two annular rows of can-holders, each row being in its own vertical plane, the planes being parallel to each other, and the carrying wheels or arms D, connected to shaft C, and the vertical wheel E, having notches $e$ in its periphery and fixed to said shaft C, and the bent lever K, provided with tooth or projection $k$, substantially as and for the purposes specified.

8. In combination, the two annular rows of can-holders, each row being in its own vertical plane, the planes being parallel to each other, and the carrying wheels or arms D, connected to shaft C, and the vertical wheel E, having notches $e$ in its periphery, and fixed to said shaft C, and the bent lever K, provided with tooth or projection $k$, each of the can-holders in one of the rows being provided with a pinion, $g$, and engaging the vertical gear G, revolving loosely on shaft C, but fixed to pulley F, substantially as and for the purposes specified.

9. In combination with can-holders, between which the longitudinal axis of the can is horizontal, the longitudinally-adjustable slides M M, bed L, and soldering-iron carriers, substantially as and for the purposes specified.

10. The bed L, and soldering-iron carriers N, and the rack $l^2$, pinion $l^3$, and set-bolt $b^3$, substantially as and for the purposes specified.

11. The combination of the bed L, slides M M, soldering-iron carriers, screw $m^4$, and the rack $l^2$, pinion $l^3$, and set-bolt $b^3$, substantially as and for the purposes specified.

12. The combination of soldering-iron carriers N, pivoted on rods $m^3$, springs $N^2$, arms $N'$, rod R, lever $R'$, rod S, and treadle $t'$, substantially as and for the purposes specified.

13. The combination of soldering-iron carriers N, pivoted on rods $m^3$, elastic connections $N^2$, arms $N'$, rod R, lever $R'$, rod S, provided with holes $s'$, and treadle, substantially as and for the purposes specified.

14. The carrier N, provided with opening $n^2$, and sleeve or case $O'$ in said opening $n^2$, and having pivot $O^3$, bearings in carrier N, and solder-iron O, and set-screw $n^4$, passing through one of the pivots $O^3$ and impinging on the solder-iron O, substantially as and for the purposes specified.

15. The combination of the solder-iron O and case $O'$, located loosely within carrier N and pivotally connected to the latter, substantially as and for the purposes specified.

16. The carrier N, provided with opening $n^2$, and sleeve or case $O'$, located loosely in said opening and having pivots $O^3$, journaled in carrier N, substantially as and for the purposes specified.

17. The combination of the carriers N, adjustable slide M, having ends $m^2$ $m^2$ and pipes 6 and 7, burners P P, and coupling 8, substantially as and for the purposes specified.

18. The shoe V, pivoted on axis $U'$, and having conical opening $v$, and pawl $V'$, substantially as and for the purposes specified.

19. The pivoted shoe V, having conical opening $v$, and pawl $V'$, fulcrumed in projection $v'$, substantially as and for the purposes specified.

20. The lever W, carrying the sheave or wheel $W^{12}$, and guide 3 and pawl 2, substantially as and for the purposes specified.

21. The combination of the pivoted shoe V, carrying the pawl $V'$, and lever W, carrying guide 3 and pawl 2, substantially as and for the purposes specified.

22. The combination of the pivoted shoe V, carrying the pawl $V'$, and lever W, carrying guide 3 and pawl 2, and wheel $W^{12}$, substantially as and for the purposes specified.

23. The bed L and the carriers N, supported from bed L, and arm U, connected to the bed L, and shoe V, and rack and pinion, and set-bolt, substantially as and for the purposes set forth.

24. The lever W, composed of relatively-adjustable sections $w^5$ and $w^4$, and carrying guide 3 and pawl 2, in combination with pivoted shoe V and carrier N, connected to a common support, and rack, pinion, and set-bolt, substantially as and for the purposes set forth.

25. The combination of the vertical annular rows of can-holders, one row being in a plane parallel to the plane in which the other row is, the oscillating soldering-irons O O, the pivoted shoes V, having pawls $V'$, levers W, having guides 3 and pawls 2, and sheave X, and solder-wires Z, substantially as and for the purposes specified.

GEO. ACKERMANN.

Witnesses:
JNO. W. STREHLI,
O. M. HIEL.